United States Patent Office.

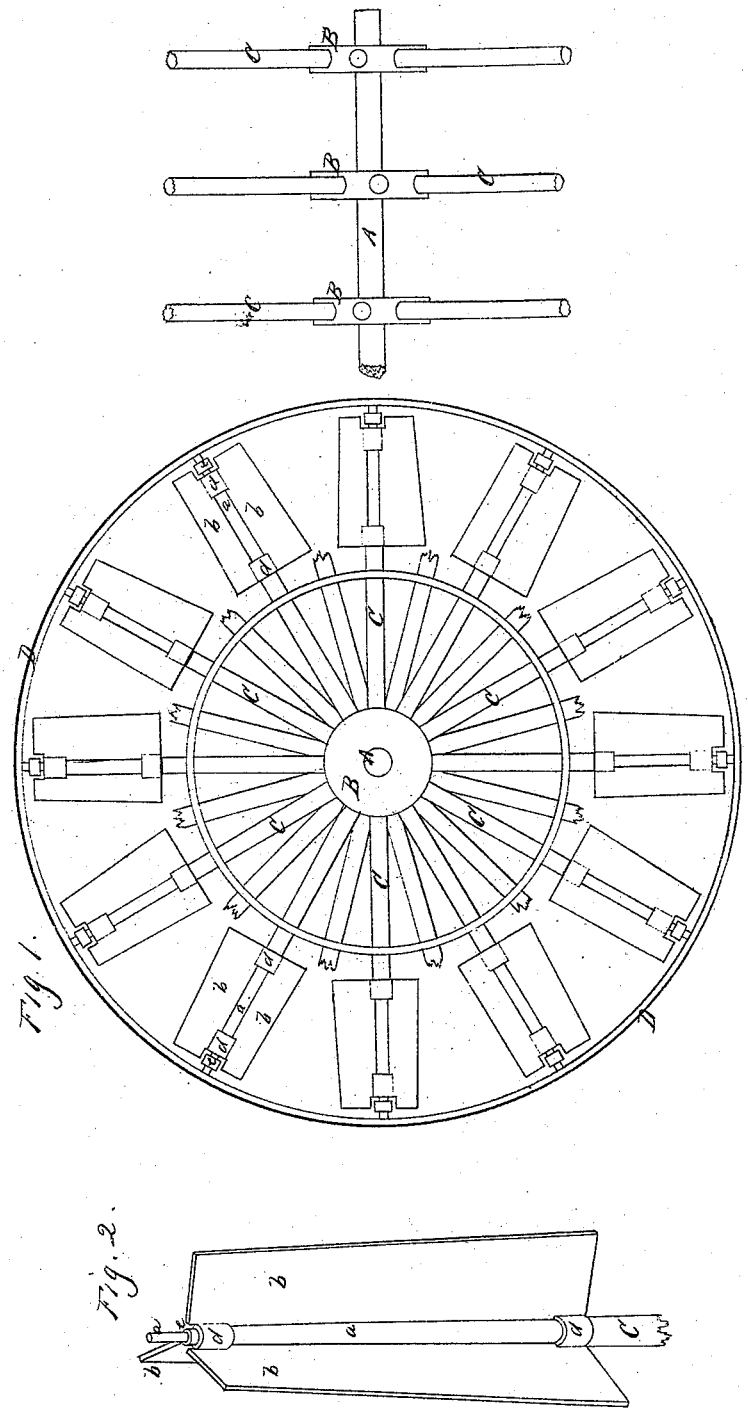

ADAM WINGARD, OF SAN FRANCISCO, CALIFORNIA.

Letters Patent No. 99,510, dated February 1, 1870.

IMPROVEMENT IN PADDLE-WHEELS.

The Schedule referred to in these Letters Patent and making part of the same

*To all whom it may concern:*

Be it known that I, ADAM WINGARD, of the city and county of San Francisco, State of California, have invented an Improved Paddle-Wheel; and I do hereby declare the following description and accompanying drawings are sufficient to enable any person skilled in the art or science to which it most nearly appertains, to make and use my said invention or improvements without further invention or experiment.

My invention relates to paddle-wheels for vessels which are driven through the water by steam-power.

The object which it is desired to accomplish by this invention, is to so construct and arrange the buckets or floats of a paddle-wheel, that there will be little or no loss of power in driving them through the water, occasioned by the pounding and lifting of the water, which is supposed to exist when the paddle-wheel is provided with the ordinary transverse floats; and It consists in constructing the paddle-wheel of one or more wheels, each one of which is provided with arms or spindles, secured to a central hub. These wheels are secured upon a shaft at the proper or required distance apart. The extreme outer end of the spokes or arms is turned or made smaller than the arm itself, so as to form an axle, upon which are placed the floats or buckets.

The buckets consist of two central hubs, having three radiating wings standing in such a position that the angle formed between each two is an obtuse angle, and which I call "tripartite buckets."

In order to give a better illustration of my invention, reference is had to the drawings accompanying this specification, and forming part of the same, in which the same letters of reference indicate identical parts wherever they occur.

A is the shaft, to which the paddle-wheel is attached, and with which it revolves.

B B B are three hubs attached to the shaft A, at the proper or required distance apart.

Secured in these hubs, and radiating from them, are arms or spokes C C C, their extreme ends being united by a metal band, D, which serves to strengthen and keep the spokes in their proper position.

Other bands may be employed at suitable distances from the hubs, when desired to give greater strength to the wheels.

The outer end of each of the spokes or arms C is made smaller than the arm itself, so as to form a journal, *a*, of sufficient length to receive the buckets or floats.

The buckets consist of three radiating wings *b b b*, of the proper or desired length, united by boxes *d d* at each end. These wings taper toward their outer ends, and are arranged about the hubs, so that the angles formed by the intersection of any two of the wings, will be an obtuse angle, the whole forming what I term a tripartite or three-part float or bucket. One of these tripartite buckets or floats is placed upon the journal *a*, on the end of each of the arms C, so as to revolve loosely about it, a small nut or projection, *e*, serving to prevent the float from coming in contact with the band or rim D.

One or more of these wheels can be used to form one paddle-wheel; but when I employ more than one, I arrange the buckets or floats so that they will alternate; that is, each float is placed so that it will be between the two floats on the wheel next to it on either side, as shown, thus enabling the buckets to act upon the entire width of water, without piling it up, so as to impede the following buckets, especially as they emerge or rise out of the water.

As the wheel revolves, the buckets have no fixed rule or position, but turn as the motion of the wheel induces them; but when they strike the water, one of the wings *b*, acting as a rudder, causes the other two wings to stand, so as to present a V-shaped opening or trough to engage the water.

As before stated, the wings *b b* taper toward their outer ends, thus allowing them to enter the water with less force than if they were of equal width their entire length; while, after they have become submerged, the greater width of the upper end causes them to have full force at the exact point where it is most required, that is, in making the sweep of the lowest part of the circle.

At the junction of the wings, with the axle, small longitudinal slots are made between the two boxes, upon which the buckets turn, which allow any air, which may become confined in the trough of the buckets by being suddenly forced into the water, to escape, thus preventing a rebound when the bucket strikes the water.

In emerging from the water, the buckets will relieve themselves of the weight of water in the trough, the motion of the wheel and driving of the waves, when the bucket has partly emerged, causing it to revolve and discharge the water; and in suddenly reversing the motion of the wheel, should it be caught when the crank is on the dead-centre, the buckets will not impede its movements in any manner, but will turn to the proper position to act in the opposite direction, allowing the wheel to be immediately reversed.

By the use of this wheel, I claim that a much greater speed can be imparted to a vessel than can possibly be obtained when the ordinary wheel, with the same amount of power, is used. The strain upon the engine will be equal at all points of the revolution of the wheel, thus preventing any jarring or shaking of the boat which is being propelled, and, consequently, allowing the engine to exert the greatest amount of force it is capable for the amount of power employed.

Having thus described my invention,

What I claim, and desire to secure by Letters Patent, is—

1. The tripartite or three-parted buckets or floats, consisting of the tapering wings $b\ b\ b$, with their boxes $d\ d$, each bucket revolving upon an axle, $a$, substantially as and for the purpose herein described.

2. A paddle-wheel, composed of one or more hubs B B, each of said hubs being provided with radiating arms C C, and each arm being provided with a tripartite bucket, similar to that herein described, substantially as herein set forth.

In witness whereof, I have hereunto set my hand and seal.

ADAM WINGARD. [L. S.]

Witnesses:
T. B. WINGARD,
J. L. BOONE.